United States Patent
Qiu et al.

(10) Patent No.: US 11,547,149 B2
(45) Date of Patent: Jan. 10, 2023

(54) ELECTRONIC CIGARETTE AND CONTROL METHOD THEREOF

(71) Applicant: JOYETECH EUROPE HOLDING GMBH, Zug (CH)

(72) Inventors: Weihua Qiu, Changzhou (CN); Neng Hua, Changzhou (CN)

(73) Assignee: JOYETECH EUROPE HOLDING GMBH, Zug (CH)

( * ) Notice: Subject to any disclaimer, the term of this patent is extended or adjusted under 35 U.S.C. 154(b) by 406 days.

(21) Appl. No.: 16/753,761

(22) PCT Filed: Sep. 29, 2018

(86) PCT No.: PCT/CN2018/108590
§ 371 (c)(1),
(2) Date: Apr. 4, 2020

(87) PCT Pub. No.: WO2019/072116
PCT Pub. Date: Apr. 18, 2019

(65) Prior Publication Data
US 2020/0288782 A1 Sep. 17, 2020

(30) Foreign Application Priority Data
Oct. 12, 2017 (CN) .......................... 201710945075.0

(51) Int. Cl.
*A24F 40/50* (2020.01)
*A24F 40/53* (2020.01)
(Continued)

(52) U.S. Cl.
CPC .............. *A24F 40/50* (2020.01); *A24F 40/30* (2020.01); *A24F 40/51* (2020.01); *A24F 40/53* (2020.01);
(Continued)

(58) Field of Classification Search
CPC ........... A24F 40/30; A24F 40/50; A24F 40/57
See application file for complete search history.

(56) References Cited

U.S. PATENT DOCUMENTS

| | | | |
|---|---|---|---|
| 6,803,545 B2 | 10/2004 | Blake et al. | |
| 2017/0071251 A1* | 3/2017 | Goch | A24F 40/485 |
| 2017/0095004 A1* | 4/2017 | Liu | H05B 1/0244 |
| 2018/0213847 A1* | 8/2018 | Reevell | A24F 40/60 |

(Continued)

FOREIGN PATENT DOCUMENTS

| | | |
|---|---|---|
| CN | 103919279 A | 7/2014 |
| CN | 203748671 U | 8/2014 |

(Continued)

OTHER PUBLICATIONS

CN 107080291 Translation (Year: 2017).*

*Primary Examiner* — Eric Yaary
(74) *Attorney, Agent, or Firm* — Cheng-Ju Chiang

(57) ABSTRACT

An electronic cigarette and a control method thereof are provided. The electronic cigarette includes a power supply device, a control device, a tobacco heating device and an e-liquid atomizing device. The power supply device is configured to provide electric power to the control device, the tobacco heating device and the e-liquid atomizing device. The tobacco heating device and the e-liquid atomizing device have a common smoke outlet. The control device is electrically connected to each of the tobacco heating device and the e-liquid atomizing device. The control device is configured to control the tobacco in the tobacco heating device to be heated when receiving an instruction for heating the tobacco and control the e-liquid in the e-liquid atomizing device to be atomized when a condition for atomizing the e-liquid is satisfied.

15 Claims, 3 Drawing Sheets

(51) Int. Cl.
    *A24F 40/65*     (2020.01)
    *A24F 40/30*     (2020.01)
    *A24F 40/51*     (2020.01)
    *A24F 40/60*     (2020.01)
    A24F 40/10     (2020.01)
    A24F 40/42     (2020.01)
    A24F 40/20     (2020.01)

(52) U.S. Cl.
    CPC .............. *A24F 40/60* (2020.01); *A24F 40/65* (2020.01); *A24F 40/10* (2020.01); *A24F 40/20* (2020.01); *A24F 40/42* (2020.01)

(56) References Cited

U.S. PATENT DOCUMENTS

| | | | | |
|---|---|---|---|---|
| 2019/0124982 A1* | 5/2019 | Atkins | .................... | A24F 40/30 |
| 2020/0288782 A1* | 9/2020 | Qiu | ........................ | A24F 40/30 |

FOREIGN PATENT DOCUMENTS

| | | | | |
|---|---|---|---|---|
| CN | 204426709 U | 7/2015 | | |
| CN | 104886776 A | 9/2015 | | |
| CN | 103653257 B | 12/2015 | | |
| CN | 204907924 U | 12/2015 | | |
| CN | 106418722 A | 2/2017 | | |
| CN | 106617325 A | 5/2017 | | |
| CN | 107080291 A * | 8/2017 | ........... | A24F 47/008 |
| CN | 107080291 A | 8/2017 | | |
| CN | 107105793 A | 8/2017 | | |
| CN | 207519623 U | 6/2018 | | |
| WO | 2016/166464 A1 | 10/2016 | | |

\* cited by examiner

US 11,547,149 B2

ELECTRONIC CIGARETTE AND CONTROL METHOD THEREOF

CROSS REFERENCE TO RELATED APPLICATION

This application is a 35 U.S.C. § 371 National Phase conversion of International (PCT) Patent Application No. PCT/CN2018/108590, filed on Sep. 29, 2018, which claims the priority of Chinese Patent Application No. 201710945075.0, filed on Oct. 12, 2017. The contents of the above-identified applications are incorporated herein by reference. The PCT International Patent Application was filed and published in Chinese.

TECHNICAL FIELD

The present invention relates to the technical field of simulated smoking, and in particular, to an electronic cigarette and a control method thereof.

BACKGROUND

Electronic cigarettes are currently widely used in some developed countries in Europe and the United States, mainly to replace traditional cigarettes. With the continuous improvement of living standards in China, people are also continuously pursuing a higher quality of life, and they gradually realize the serious harm of smoking, and quitting smoking has gradually become a common understanding. Therefore, alternatives like electronic cigarettes are gradually gaining popularity.

At present, electronic cigarettes are used to atomize e-liquid, and the atomized e-liquid are sucked. Although the e-liquid is constantly improved to make it taste close to real smoke, there are still large differences between them, which makes it difficult for smokers to accept, and the electronic cigarette has not been widely promoted.

SUMMARY

In view of the shortcomings of the prior art, an object of the present invention is to provide an electronic cigarette with mixed atomization of tobacco and e-liquid, and a control method thereof.

To achieve the above objective, the technical solution of the present invention is as follows:

An electronic cigarette includes a power supply device, a control device, a tobacco heating device and an e-liquid atomizing device. The power supply device is configured to provide electric power to the control device, the tobacco heating device and the e-liquid atomizing device. The tobacco heating device and the e-liquid atomizing device have a common smoke outlet. The control device is electrically connected to each of the tobacco heating device and the e-liquid atomizing device. The control device is configured to control the tobacco in the tobacco heating device to be heated when receiving an instruction for heating the tobacco and control the e-liquid in the e-liquid atomizing device to be atomized when a condition for atomizing the e-liquid is satisfied. The smoke generated by the tobacco heating device and the mist generated by the e-liquid atomizing device are mixed and then discharged from the smoke outlet.

In one embodiment, the control device includes a control element, a first trigger element electrically connected to the control element, and a second trigger element electrically connected to the control element. The control element controls the tobacco in the tobacco heating device to be heated after receiving an instruction from the first trigger element, and the control element controls the e-liquid in the e-liquid atomizing device to be atomized after receiving an instruction from the second trigger element.

In one embodiment, the control device includes a control element and a first trigger element. The control element controls the tobacco in the tobacco heating device to be heated after receiving an instruction from the first trigger element, and after the tobacco is heated to meet a preset condition, the control element controls the e-liquid in the e-liquid atomizing device to be atomized.

In one embodiment, the preset condition is: the duration of heating the tobacco reaches a predetermined duration, and/or the airflow velocity reaches a preset threshold, wherein the airflow velocity is detected by an airflow sensor provided in the electronic cigarette.

In one embodiment, the control device is configured to issue a prompt to remind the user to start smoking when the temperature of the tobacco heating device after being heated reaches a preset threshold.

In one embodiment, the tobacco heating device includes a heating element and a tobacco storage apparatus. The heating element is provided with a plurality of heating sections separately controlled by the control device. The control device further includes a smoke sensor provided at the smoke outlet to detect the content of a target substance. The control device controls the heating element to increase a heating section for heating when the content of the target substance is less than a preset value, wherein the target substance is a substance from the tobacco, not from the e-liquid.

In one embodiment, the control element controls each heating section of the plurality of heating sections to be sequentially heated along an airflow direction.

In one embodiment, when the content of the target substance is less than the preset value, the control device controls the heating section currently being heated to stop heating, and controls a next heating section in the airflow direction after the current heating section to start heating.

The present invention also provides a method for controlling the above electronic cigarette, the method includes:
heating the tobacco in the tobacco heating device when an instruction for heating the tobacco is received; and
atomizing the e-liquid in the e-liquid atomizing device when a condition for atomizing the e-liquid is satisfied.

In one embodiment, atomizing the e-liquid in the e-liquid atomizing device when a condition for atomizing the e-liquid is satisfied includes: atomizing the e-liquid in the e-liquid atomizing device after a second trigger instruction is received.

In one embodiment, atomizing the e-liquid in the e-liquid atomizing device when a condition for atomizing the e-liquid is satisfied includes: atomizing the e-liquid in the e-liquid atomizing device after the tobacco is heated to meet a preset condition.

In one embodiment, the preset condition is: the duration of heating the tobacco reaches a predetermined duration, and/or the airflow velocity reaches a preset threshold, wherein the airflow velocity is detected by an airflow sensor provided in the electronic cigarette.

In one embodiment, the control method further includes: issuing a prompt to remind the user to start smoking when the temperature of the tobacco heating device after being heated reaches a preset threshold.

In one embodiment, the tobacco heating device includes a heating element and a tobacco storage apparatus. The heating element is provided with a plurality of heating sections separately controlled by the control device. The control device further includes a smoke sensor provided at the smoke outlet to detect the content of a target substance. The target substance is a substance from the tobacco, not from the e-liquid. Heating the tobacco in the tobacco heating device when an instruction for heating the tobacco is received includes:

controlling the heating element to increase a heating section for heating when the smoke sensor detects that the content of the target substance in the smoke is less than a preset value.

In one embodiment, each heating section of the plurality of heating sections is controlled to be sequentially heated along an airflow direction.

In one embodiment, when the smoke sensor detects that the content of the target substance in the smoke is less than a preset value, the heating section currently being heated is controlled to stop heating, and a next heating section in the airflow direction after the current heating section is controlled to start heating.

The present invention also provides an electronic cigarette, wherein the electronic cigarette includes a processor and a memory, the memory stores therein at least one program instruction, and the processor, by loading and executing the at least one program instruction, implements the above control method.

The present invention has the following beneficial effects:

1. The control device controls the tobacco in the tobacco heating device to be heated when receiving an instruction for heating the tobacco, and controls the e-liquid in the e-liquid atomizing device to be atomized when a condition for atomizing the e-liquid is satisfied, and the smoke generated by the tobacco heating device and the mist generated by the e-liquid atomizing device are mixed and then discharged from the smoke outlet, to realize the mixed atomization of the tobacco and the e-liquid, which is not only beneficial to human health, but also the taste is closer to real smoke, so that it is easy to be accepted by users. It can also avoid dry burning due to no airflow through the heating element if the e-liquid is atomized in advance.

2. The control device includes a control element, a first trigger element, and a second trigger element. After receiving an instruction from the first trigger element, the control element controls the tobacco in the tobacco heating device to be heated, and after receiving an instruction from the second trigger element, the control element controls the e-liquid in the e-liquid atomizing device to be atomized, to realize the atomization of the tobacco heating device and the e-liquid atomizing device in a sequential manner. This control method has intuitive operation and reliable performance.

3. The control device includes a control element and a first trigger element. After receiving an instruction from the first trigger element, the control element controls the tobacco in the tobacco heating device to be heated, and after the tobacco is heated to meet a preset condition, the control element controls the e-liquid in the atomizing device to be atomized, to realize the atomization of the tobacco heating device and the e-liquid atomizing device in a sequential manner. This control method can realize the automatic control of the atomization of the e-liquid atomizing device. Thus, it is easy to operate and improves the user's comfort and dignity. The preset condition may be: the duration of heating the tobacco reaches a predetermined duration, and/ or the airflow velocity reaches a preset threshold, wherein the airflow velocity is detected by an airflow sensor provided in the electronic cigarette.

4. The tobacco heating device includes a heating element and a tobacco storage apparatus, so that the airflow passes through the heating element and reaches the tobacco in the tobacco storage apparatus to realize the heating and atomization of the tobacco. The heating element is provided with a plurality of heating sections separately controlled by the control device. The control device further includes a smoke sensor provided at the smoke outlet to detect the content of a target substance. When the content of the target substance in the smoke is less than a preset value, the control device controls the heating element to increase a heating section for heating, to thereby save energy and accurately control the smoke concentration in the smoke and further enhance the taste of the electronic cigarette.

DETAILED DESCRIPTION OF PREFERRED EMBODIMENTS

Hereinafter, the present invention is described in detail through specific but non-limiting embodiments, so that the advantages and the features of the present invention can be much easily understood by those skilled in the art.

Figure 1:
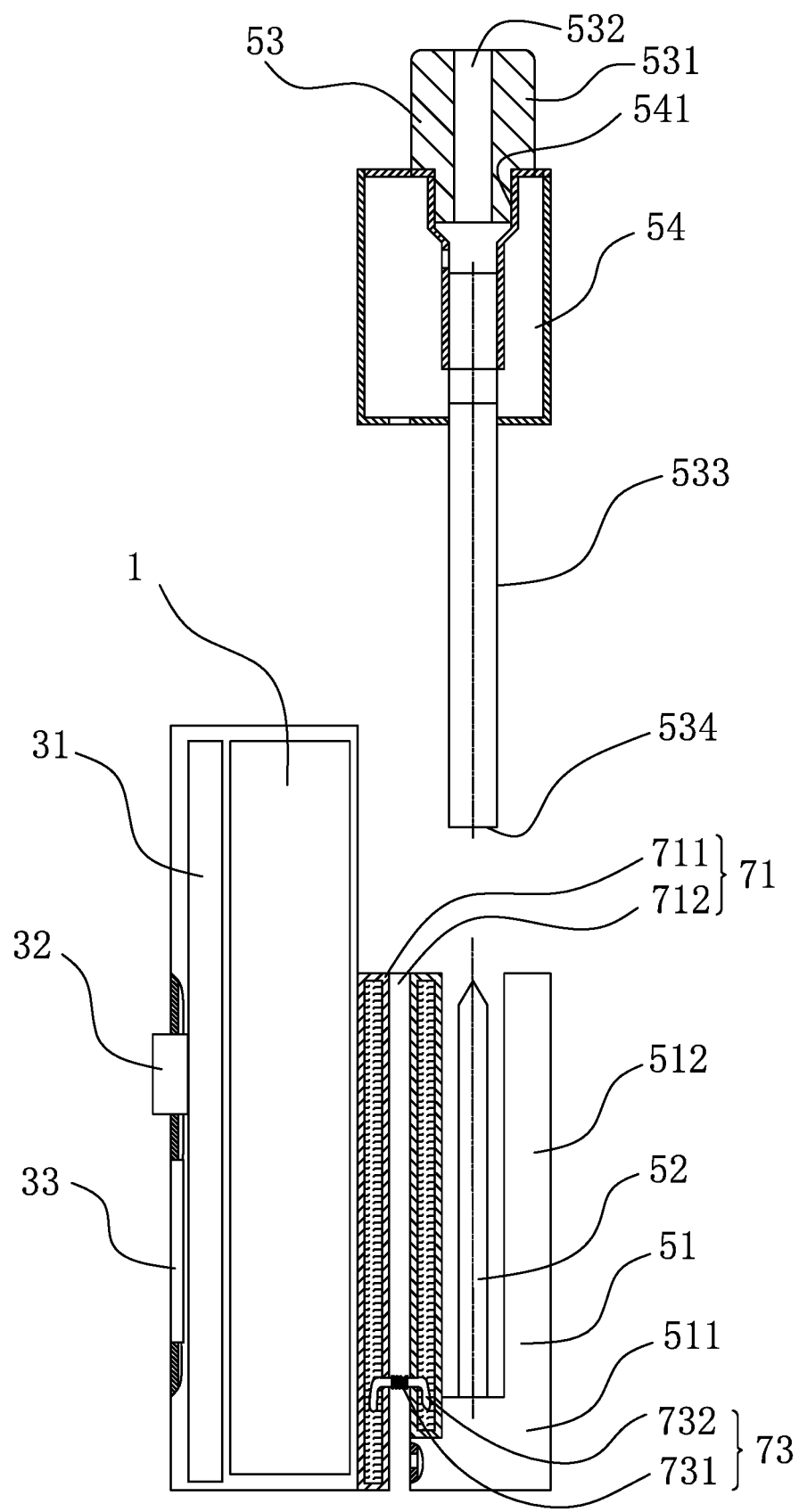
FIG. 1 is an exploded view of an electronic cigarette according to an embodiment of the present invention.
Figure 2:
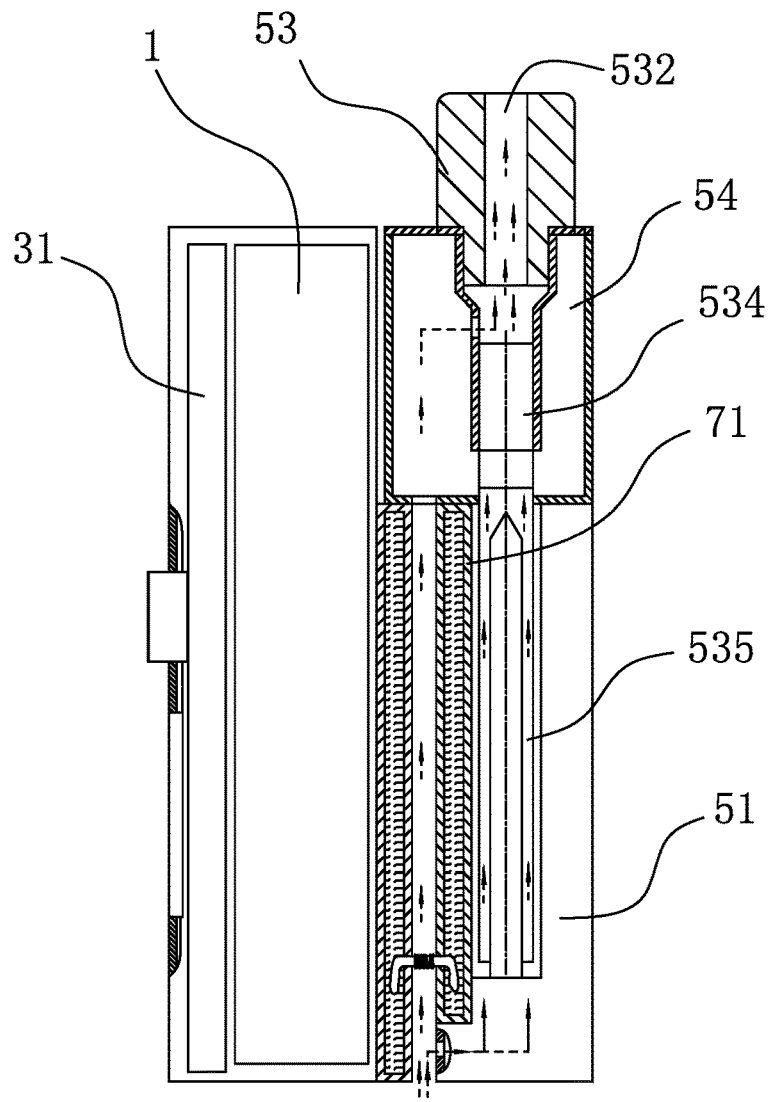
FIG. 2 is an assembled view of the electronic cigarette shown in FIG. 1.

As shown in FIG. 1 and FIG. 2, the electronic cigarette according to the embodiment of the present invention includes a power supply device 1, a control device, a tobacco heating device, and an e-liquid atomizing device. The power supply device 1, the tobacco heating device and the e-liquid atomizing device are arranged side by side to form a box shape.

The power supply device 1 is configured to provide electric power to the control device, the tobacco heating device and the e-liquid atomizing device. In the embodiment, the power supply device 1 is a detachable battery.

The e-liquid atomizing device is located on a side of the power supply device 1 and includes an e-liquid storage assembly 71 and an atomizing assembly 73. The e-liquid storage assembly 71 includes a liquid storage chamber 711 configured for storing e-liquid. The liquid storage chamber 711 is annular-shaped and is provided with a first airflow channel 712 therein. The bottom of the first airflow channel 712 forms an airflow inlet for the entire electronic cigarette. In other embodiments, there may be multiple liquid storage chambers for storing different e-liquids, such as different nicotine concentrations or different tastes, etc.

The atomizing assembly 73 includes a heating member 731 (a heating wire in the embodiment) and a liquid guiding member 732 (a liquid guiding cotton in the embodiment) attached to the heating member 731. The two ends of the liquid guiding member 732 are respectively extended into the liquid storage chamber 711, and the e-liquid in the liquid storage chamber 711 is absorbed into the heating member 731 to be heated and atomized.

The tobacco heating device is located on a side of the e-liquid atomizing device away from the power supply device 1 and includes a fixing seat 51, a heating element 52, a cartridge 53, and a cartridge holder 54. The fixing seat 51 includes a horizontal portion 511 and a vertical portion 512. The vertical portion 512 is located on a side away from the e-liquid atomizing device. An airflow channel is provided inside the horizontal portion 511 between the side of the horizontal portion 511 adjacent to the e-liquid atomizing device and the top surface of the horizontal portion 511.

The heating element 52 is vertically installed on the horizontal portion 511 of the fixing seat 51, and is located between the liquid storage chamber 711 and the vertical portion 512. The heating element 52 is provided with a plurality of heating sections which are conductive with each other and are sequentially heated along the airflow direction. The heating sections are separately controlled by the control device. In this way, after the lower heating section is heated, the heat can be automatically transferred to the upper heating section, and the airflow heated by the lower heating section will also move up under suction to heat the upper heating section, thereby saving the energy required for heating.

The cartridge holder 54 is installed on the top of the e-liquid atomizing device and the fixing seat 51, and the bottom surface of the cartridge holder 54 is attached to the top surface of the liquid storage chamber 711 and the top surface of the vertical portion 512. A recessed portion 541 is provided in the middle of the cartridge holder 54 for fixing the cartridge 53 therein. An airflow passage is provided inside the cartridge holder 54 between the point where the cartridge holder 54 is in contact with the liquid storage chamber 711 and the inner wall of the recessed portion 541.

The cartridge 53 is used to store one or more of cigarettes, shredded tobacco or regenerated tobacco leaves. The cartridge 53 is provided with a head 531 so that the cartridge 53 can be detachably fixed to the cartridge holder 54. A through hole 532 is provided in the middle of the head 531. A lower portion of the cartridge 53 is provided with a sleeve pipe 533. The sleeve hole 534 inside the sleeve pipe 533 is communicated with the through hole 532, and the top of the through hole 532 forms a smoke outlet for the entire electronic cigarette. The sleeve pipe 533 is provided with an opening (not labelled) corresponding to the third airflow channel. The size of the sleeve hole 534 is larger than the size of the heating element 52, so that there is a first gap 535 between the inner wall of the sleeve pipe 533 and the heating element 52. In other embodiments, instead of using detachable cartridges, tobacco storage apparatus of other structures may be used, such as a storage structure that can directly replace cigarettes, shredded tobacco, or regenerated tobacco leaves.

Therefore, a second airflow channel and a third airflow channel are formed between the airflow inlet and the smoke outlet. As shown in FIG. 2 (the direction indicated by the arrows is the airflow direction), the second airflow channel includes the airflow channel in the horizontal portion 511, the first gap 535, the sleeve hole 534 and the through hole 532, so that the airflow enters from the airflow inlet and then passes through the airflow channel in the horizontal portion 511, the first gap 535, the sleeve hole 534 and the through hole 532 to discharge from the smoke outlet, and when the airflow passes through the tobacco heating device, it carries the smoke generated by the tobacco heating device to discharge from the smoke outlet. The third airflow channel includes the first airflow channel 712, the airflow passage in the cartridge holder 54, the sleeve hole 534 and the through hole 532, so that the airflow enters from the airflow inlet and then passes through the first airflow channel 712, the airflow passage in the cartridge holder 54, the sleeve hole 534 and the through hole 532 to discharge from the smoke outlet, and when the airflow passes through the e-liquid atomizing device, it carries the mist generated by the e-liquid atomizing device to discharge from the smoke outlet. In this way, the smoke generated by the tobacco heating device and the mist generated by the e-liquid atomizing device are mixed in the sleeve hole 534 and the through hole 532 and then discharged from the smoke outlet.

Optionally, the electronic cigarette may further include a temperature sensor for detecting the temperature of the tobacco heating device or the temperature of the tobacco heated by the tobacco heating device. When the temperature detected by the temperature sensor reaches a preset threshold, it indicates that the tobacco has started to form smoke. That is, at this time, the user can normally suck the smoke obtained from the tobacco atomization. Therefore, at this time, the control device can issue a prompt to remind the user to start smoking, wherein the method of issuing the prompt may be vibration, ringing, lighting, etc., which is not limited.

Figure 3:
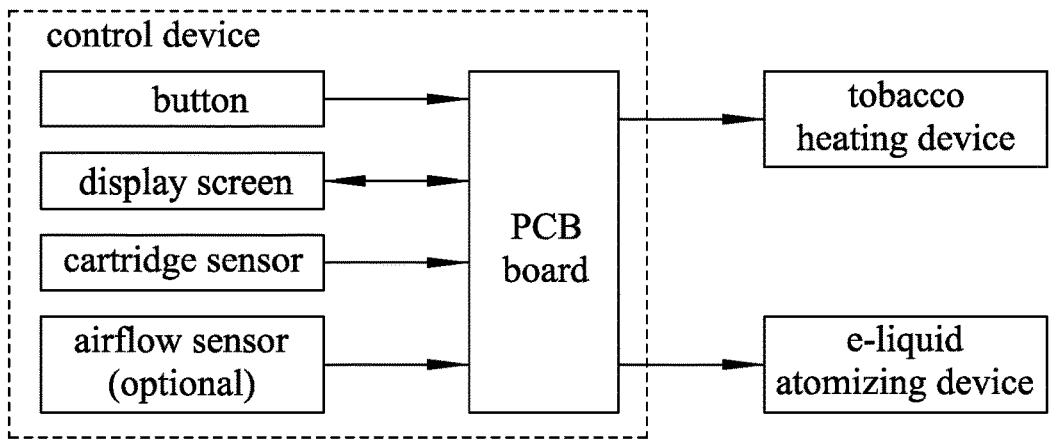
FIG. 3 is a control logic block diagram of the electronic cigarette shown in FIG. 1.

As shown in FIG. 3, the control device is electrically connected to the tobacco heating device and the e-liquid atomizing device, for controlling the tobacco heating device and the e-liquid atomizing device, respectively. Specifically, the control device is configured to control the tobacco in the tobacco heating device to be heated when receiving an instruction for heating the tobacco, and control the e-liquid in the e-liquid atomizing device to be atomized when a condition for atomizing the e-liquid is satisfied.

The control device includes a PCB board 31 and a plurality of electronic components coupled to the PCB board 31. In the embodiment, the electronic components include a button 32, a display screen 33, a cartridge sensor, an airflow sensor, etc. The PCB board 31 is located on a side of the power supply device 1 away from the e-liquid atomizing device, and control elements are provided on the PCB board 31. The key 32 and the display screen 33 are located on a side (i.e., the outside) of the PCB board 31 away from the power supply device 1. The key 32 is used for the user to trigger the heating operation and/or the atomizing operation. The display screen 33 is a touch display screen used for displaying the status or reminding the user, and can also be used for triggering. In other embodiments, the display screen 33 may also be an ordinary display screen, which is only used to display the status or remind the user. The cartridge sensor is located on the cartridge holder 54 and is used to sense whether the cartridge 53 is inserted. The cartridge sensor may be a pressure sensor, a magnetic sensor, or a light-sensitive sensor (of course, in other embodiments, the cartridge sensor may be omitted, and the user directly judges whether the cartridge 53 is inserted). The airflow sensor is located at the smoke outlet and is used to detect the airflow velocity at the smoke outlet.

In the embodiment, the control device may further include a smoke sensor provided at the smoke outlet to detect the content of a target substance. In this way, when the content of the target substance is less than a preset value, the control device controls the heating element 52 to increase a heating section for heating. The target substance may be a substance from the tobacco, not from the e-liquid, such as carbon monoxide, heavy metal elements, and the like, which is not described herein. Of course, in actual implementation, when the detected content of the target substance is less than the preset value, in order to prevent the tobacco from affecting the taste after excessive heating, the control device may control the current heating section of the heating element 52 to stop heating, and control a next heating section in the airflow direction to start heating.

During sucking operation, the cartridge 53 is firstly inserted into the heating element 52. After the cartridge 53 is inserted into the heating element 52, the cartridge sensor detects that the cartridge 53 has been inserted, and the control device reminds the user to start the control of atomization.

The electronic cigarette control method includes the following two steps:

heating the tobacco in the tobacco heating device when an instruction for heating the tobacco is received; and atomizing the e-liquid in the e-liquid atomizing device when a condition for atomizing the e-liquid is satisfied.

Figure 4:
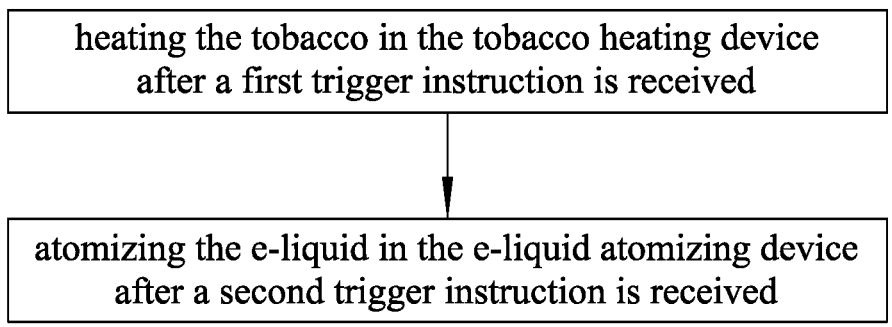
FIG. 4 is a flowchart of a control method of the electronic cigarette shown in FIG. 1.

The control method may have various implementations. In the first embodiment shown in FIG. 4, the above two steps are specifically as follows:

when the user issues a first trigger instruction for heating the tobacco through a first trigger element, the control device receives the first trigger instruction and controls the tobacco in the tobacco heating device to be heated;

after the user judges that the smoke is generated or after the user receives a prompt, the user issues a second trigger instruction for atomizing the e-liquid through a second trigger element, the control device receives the second trigger instruction and controls the e-liquid in the e-liquid atomizing device to be atomized.

Specifically, the user can issue the first and second trigger instructions by pressing a physical button, touching, sound control, tapping, making a predetermined gesture, and the like.

Figure 5:
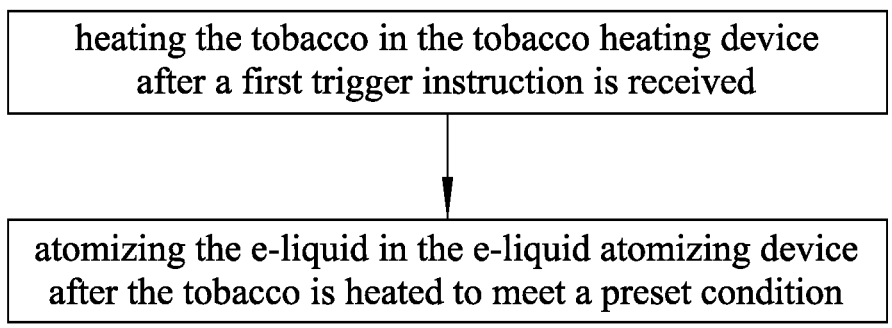
FIG. 5 is a flowchart of a control method of the electronic cigarette shown in FIG. 1 according to another embodiment.

FIG. 5 shows a second embodiment of the control method, wherein atomizing the e-liquid in the e-liquid atomizing device when a condition for atomizing the e-liquid is satisfied includes: after the tobacco is heated to meet a preset condition, atomizing the e-liquid in the e-liquid atomizing device. The preset condition may be: the duration of heating the tobacco reaches a predetermined duration, and/or the airflow velocity reaches a preset threshold, wherein the airflow velocity is detected by an airflow sensor provided in the electronic cigarette. In this way, after the user firstly triggers the heating operation, the control device controls the tobacco to be heated and determines whether the duration of heating the tobacco reaches the predetermined duration or whether the airflow velocity detected by the airflow sensor reaches the preset threshold. If it is, it is considered that the user starts suction. At this time, the e-liquid is atomized automatically, so that there is no need for the user to trigger, thereby simplifying operation. In actual implementation, after the user receives the prompt, the user can start to suck, and then the electronic cigarette detects the airflow velocity using the airflow sensor.

If the heating element is provided with a plurality of heating sections separately controlled by the control device, the control device further includes a smoke sensor provided at the smoke outlet for detecting the content of a target substance (a substance from the tobacco, not from the e-liquid in the embodiment). In the above, heating the tobacco in the tobacco heating device when an instruction for heating the tobacco is received includes: when the smoke sensor detects that the content of the target substance in the smoke is less than a preset value, it indicates that the tobacco at current position has been substantially burnt off after being heated, at this time, in order to improve the taste, the heating element can be controlled to increase a heating section for heating. That is, when the smoke sensor detects that the content of the target substance in the smoke is less than the preset value, the heating section currently being heated is controlled to stop heating, and a next heating section in the airflow direction after the current heating section is started to heat.

Another embodiment of the present invention further provides an electronic cigarette. The electronic cigarette includes a processor and a memory, the memory stores therein at least one program instruction, and the processor, by loading and executing the at least one program instruction, implements the control method mentioned in the foregoing embodiments.

The above are only specific embodiments of the present invention, but the scope of protection of the present invention is not limited to this. Any person skilled in the art can easily think of changes or replacements within the technical scope disclosed in the present invention, which shall be covered in the scope of protection of the present invention. Therefore, the scope of protection of the present invention shall be subject to the claims of the present invention.

What is claimed is:

1. An electronic cigarette, comprising a power supply device, a control device, a tobacco heating device and an e-liquid atomizing device, wherein the power supply device is configured to provide electric power to the control device, the tobacco heating device and the e-liquid atomizing device, the tobacco heating device and the e-liquid atomizing device have a common smoke outlet, the control device is electrically connected to each of the tobacco heating device and the e-liquid atomizing device, the control device is configured to control the tobacco in the tobacco heating device to be heated when receiving an instruction for heating the tobacco and control the e-liquid in the e-liquid atomizing device to be atomized when a condition for atomizing the e-liquid is satisfied, and the smoke generated by the tobacco heating device and the mist generated by the e-liquid atomizing device are mixed and then discharged from the smoke outlet;

wherein the tobacco heating device comprises a heating element and a tobacco storage apparatus, the heating element is provided with a plurality of heating sections separately controlled by the control device, the control device further comprises a smoke sensor provided at the smoke outlet to detect the content of a target substance, and the control device controls the heating element to increase a heating section for heating when the content of the target substance is less than a preset value, wherein the target substance is a substance from the tobacco, not from the e-liquid.

2. The electronic cigarette according to claim 1, wherein the control device comprises a control element, a first trigger element electrically connected to the control element, and a second trigger element electrically connected to the control element, wherein the control element controls the tobacco in the tobacco heating device to be heated after receiving an instruction from the first trigger element, and the control element controls the e-liquid in the e-liquid atomizing device to be atomized after receiving an instruction from the second trigger element.

3. The electronic cigarette according to claim 1, wherein the control device comprises a control element and a first trigger element, wherein the control element controls the tobacco in the tobacco heating device to be heated after receiving an instruction from the first trigger element, and after the tobacco is heated to meet a preset condition, the control element controls the e-liquid in the e-liquid atomizing device to be atomized.

4. The electronic cigarette according to claim 3, wherein the preset condition is: the duration of heating the tobacco reaches a predetermined duration, and/or the airflow velocity reaches a preset threshold, wherein the airflow velocity is detected by an airflow sensor provided in the electronic cigarette.

5. The electronic cigarette according to claim 3, wherein the control device is configured to issue a prompt to remind the user to start smoking when the temperature of the tobacco heating device after being heated reaches a preset threshold.

6. The electronic cigarette according to claim 1, wherein the control device controls each heating section of the plurality of heating sections to be sequentially heated along an airflow direction.

7. The electronic cigarette according to claim 6, wherein when the content of the target substance is less than the preset value, the control device controls the heating section currently being heated to stop heating, and controls a next heating section in the airflow direction after the current heating section to start heating.

8. A method for controlling an electronic cigarette, the electronic cigarette comprising a power supply device, a control device, a tobacco heating device and an e-liquid atomizing device, wherein the power supply device is configured to provide electric power to the control device, the tobacco heating device and the e-liquid atomizing device, the tobacco heating device and the e-liquid atomizing device have a common smoke outlet, the control device is electrically connected to each of the tobacco heating device and the e-liquid atomizing device, the control device is configured to control the tobacco in the tobacco heating device to be heated when receiving an instruction for heating the tobacco and control the e-liquid in the e-liquid atomizing device to be atomized when a condition for atomizing the e-liquid is satisfied, and the smoke generated by the tobacco heating device and the mist generated by the e-liquid atomizing device are mixed and then discharged from the smoke outlet, wherein the method comprises:
heating the tobacco in the tobacco heating device when an instruction for heating the tobacco is received; and
atomizing the e-liquid in the e-liquid atomizing device when a condition for atomizing the e-liquid is satisfied;
wherein the tobacco heating device comprises a heating element and a tobacco storage apparatus, the heating element is provided with a plurality of heating sections separately controlled by the control device, the control device further comprises a smoke sensor provided at the smoke outlet to detect the content of a target substance, the target substance is a substance from the tobacco, not from the e-liquid, wherein heating the tobacco in the tobacco heating device when an instruction for heating the tobacco is received includes:
controlling the heating element to increase a heating section for heating when the smoke sensor detects that the content of the target substance in the smoke is less than a preset value.

9. The control method according to claim 8, wherein atomizing the e-liquid in the e-liquid atomizing device when a condition for atomizing the e-liquid is satisfied includes: atomizing the e-liquid in the e-liquid atomizing device after a second trigger instruction is received.

10. The control method according to claim 8, wherein atomizing the e-liquid in the e-liquid atomizing device when a condition for atomizing the e-liquid is satisfied includes: atomizing the e-liquid in the e-liquid atomizing device after the tobacco is heated to meet a preset condition.

11. The control method according to claim 10, wherein the preset condition is: the duration of heating the tobacco reaches a predetermined duration, and/or the airflow velocity reaches a preset threshold, wherein the airflow velocity is detected by an airflow sensor provided in the electronic cigarette.

12. The control method according to claim 10, further comprising: issuing a prompt to remind the user to start smoking when the temperature of the tobacco heating device after being heated reaches a preset threshold.

13. The control method according to claim 8, wherein each heating section of the plurality of heating sections is controlled to be sequentially heated along an airflow direction.

14. The control method according to claim 13, wherein when the smoke sensor detects that the content of the target substance in the smoke is less than a preset value, the heating section currently being heated is controlled to stop heating, and a next heating section in the airflow direction after the current heating section is controlled to start heating.

15. An electronic cigarette, wherein the electronic cigarette comprises a processor and a memory, the memory stores therein at least one program instruction, and the processor, by loading and executing the at least one program instruction, implements the control method according to claim 8.

* * * * *